(12) United States Patent
Sanpei et al.

(10) Patent No.: US 6,885,925 B2
(45) Date of Patent: Apr. 26, 2005

(54) HAPTIC CONTROLLER WHICH PERFORMS CONTROL USING A FORCE PATTERN THAT IS REPRESENTED BY PRESCRIBED FUNCTIONS EACH CONNECTING PARTICULAR POINTS

(75) Inventors: Yoshio Sanpei, Tokyo (JP); Noriyuki Fukushima, Tokyo (JP); Hironori Kato, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 127 days.

(21) Appl. No.: 10/384,383

(22) Filed: Mar. 7, 2003

(65) Prior Publication Data

US 2004/0054446 A1 Mar. 18, 2004

(Under 37 CFR 1.47)

(30) Foreign Application Priority Data

Mar. 11, 2002 (JP) ........................................ 2002-065863

(51) Int. Cl.⁷ ........................... G06F 7/00; B60R 22/00; E05F 15/00; G09G 5/08
(52) U.S. Cl. ........................... 701/36; 701/49; 345/161; 345/184; 318/671; 318/673; 463/37
(58) Field of Search ..................... 701/36, 49; 345/161, 345/184; 318/671, 673; 463/37

(56) References Cited

U.S. PATENT DOCUMENTS

| | | | | |
|---|---|---|---|---|
| 5,734,373 A | * | 3/1998 | Rosenberg et al. | 345/161 |
| 6,154,201 A | | 11/2000 | Levin et al. | 345/184 |
| 6,169,540 B1 | * | 1/2001 | Rosenberg et al. | 715/701 |
| 6,348,772 B1 | | 2/2002 | May | 318/430 |
| 6,580,417 B1 | * | 6/2003 | Rosenberg et al. | 345/157 |
| 6,636,197 B1 | * | 10/2003 | Goldenberg et al. | 345/156 |
| 2001/0045941 A1 | | 11/2001 | Rosenberg et al. | 345/161 |

* cited by examiner

*Primary Examiner*—Thomas G. Black
*Assistant Examiner*—Brian Broadhead
(74) *Attorney, Agent, or Firm*—Brinks Hofer Gilson & Lione

(57) ABSTRACT

A force pattern is formed by particular points in which forces to be supplied to a knob are set for a plurality of particular positions that are set in a movement range of the knob and prescribed functions connect each adjoining pair of particular positions. A storing section stores the particular points. A computing section determines in which region between the particular positions the knob is located, and calculates a control value to be supplied to an actuator on the basis of the prescribed function connecting the particular points.

20 Claims, 8 Drawing Sheets

HAPTIC CONTROLLER WHICH PERFORMS CONTROL USING A FORCE PATTERN THAT IS REPRESENTED BY PRESCRIBED FUNCTIONS EACH CONNECTING PARTICULAR POINTS

TECHNICAL FIELD

The present invention relates to a haptic controller that is provided in a manipulation device for manipulating a vehicular apparatus, for example, and gives a manipulative feel to a manipulator, that is, stimulates his force sense (haptic sense), through a manipulation member by supplying a prescribed force to the manipulation member in accordance with its position.

BACKGROUND

Among conventional manipulation devices for manipulating a vehicular apparatus are ones that are equipped with a haptic controller of the above kind. Conventional haptic controllers include an actuator as a motive power source for supplying force to a manipulation member that is manipulated manually, a detecting section for detecting a position of the manipulation member, and a computing means for calculating, in accordance with the position of the manipulation member detected by the detecting section, a control value to be used for controlling the actuator.

The computing means includes a storing section in which a preset force pattern to be used for supplying a prescribed force to the manipulation member in accordance with its position is stored, and a computing section for producing a control value on the basis of the force pattern in accordance with a position of the manipulation member detected by the detecting section. The force pattern is formed by points in which forces to be supplied to the actuator are set for respective fine sections of a movement range of the manipulation member.

In the above-described haptic controller, the manipulation member position is detected by the detecting section as soon as the manipulation member is manipulated. In the computing means, the computing section produces a control value on the basis of the force pattern that is stored in the storing section in accordance with a position of the manipulation member and sends the control valve to the actuator. The actuator outputs a force on the basis of the control value and the force is transmitted to the manipulation member, which gives a manipulative feel to the manipulator.

In the above conventional haptic controller, the force pattern is formed by points in which forces to be supplied to the manipulation member are set for respective fine sections of manipulation member movement range. Hence, the number of points that are set to form the force pattern is very large. Therefore, to adjust or alter the force pattern, it is necessary to modify a large number of points one by one.

BRIEF SUMMARY

The present invention has been made in view of the above circumstances, and an object of the invention is therefore to provide a haptic controller in which a force pattern to be used for supplying a prescribed force to a manipulation member in accordance with a manipulation of the manipulation member can be set with a small amount of data.

To attain the above object, the invention provides a haptic controller comprising an actuator as a motive power source for supplying force to a manipulation member that is manipulated manually; a detecting section for detecting a position of the manipulation member; and computing means for calculating a control value to be used for controlling the actuator on the basis of the position of the manipulation member detected by the detecting section, the computing means comprising a storing section for storing a force pattern that is preset to supply a prescribed force to the manipulation member in accordance with the position of the manipulation member; and a computing section for calculating the control value on the basis of the force pattern and the position of the manipulation member detected by the detecting section, wherein the force pattern is formed by particular points in which forces to be supplied to the manipulation member are set for a plurality of particular positions that are within a movement range of the manipulation member and prescribed functions connect each pair of adjoining ones of the particular positions wherein regions are defined between the particular positions and wherein the computing section determines in which region the position of the manipulation member detected by the detecting section is located, and calculates the control value on the basis of the prescribed function that corresponds to the region.

In the above-configured haptic controller, as soon as the manipulation member is manipulated, the detecting section detects a position of the manipulation member. In the computing means, the computing section calculates a force to be supplied to the manipulation member on the basis of the force pattern that is stored in the storing section. More specifically, which region in which the manipulation member is located, is determined, and a control value to be supplied to the actuator is calculated on the basis of a prescribed function connecting particular points that correspond to the two respective particular positions forming the region.

A force that is produced by the actuator on the basis of the control value is transmitted to the manipulation member and stimulates the force sense of the manipulator. That is, the manipulator receives a manipulative feel from the manipulation member.

According to the invention, the amount of data that are necessary to set a force pattern can be made small because particular points are stored in the storing section and a function connecting the particular points that correspond to respective adjoining particular positions is determined by the computing section.

In accordance with another aspect of the invention, at least one of the particular points in the movement range of the manipulation member may be a reversing point to reverse the direction of force to be supplied to the manipulation member.

In the thus-configured haptic controller, even if the manipulator stops manipulating the manipulation member at an arbitrary position in the movement range, the manipulation member is supplied with such a force as to be directed toward one of the two positions forming the movement range. Therefore, the manipulation member can be relocated to one of the two positions in the movement range.

In accordance with yet another aspect of the invention, a plurality of force patterns may be set, and a force pattern switching section may be provided that switches between force patterns in a state that the manipulation member is located in a prescribed region of the movement range of the manipulation member.

In the thus-configured haptic controller, force pattern switching is not made at a certain position but in a prescribed region. This makes it easier to judge whether switching is necessary and increases the reliability of the force pattern switching.

In accordance with still another aspect of the invention, the force pattern switching section may switch between force patterns when forces of the force patterns concerned are in the same direction.

In the thus-configured haptic controller, the direction of a force that is supplied to the manipulation member after force pattern switching remains the same as that before the switching. This makes it possible to reduce the degree of an incongruous feeling the manipulator may have due to a force change at the time of force pattern switching.

In accordance with a further aspect of the invention, the force pattern switching section may switch between force patterns when the difference between the magnitudes of forces of the respective force patterns concerned is within a prescribed value.

In the thus-configured haptic controller, only a small force change occurs between a force that is supplied to the manipulation member before force pattern switching and that after the switching. This makes it possible to reduce the degree of an incongruous feeling the manipulator may have due to a force change at the time of force pattern switching.

In accordance with a still further aspect of the invention, identification marks may be provided around the manipulation member to correspond to prescribed regions in the movement range of the manipulation member.

In the thus-configured haptic controller, the feel in manipulating the manipulation member can be varied relative to the identification marks.

In accordance with a more further aspect of the invention, the haptic controller may be provided in a manipulation device for manipulating a vehicular apparatus.

In such a haptic controller, the manipulation member provided in the manipulation device of the vehicular apparatus can cause a manipulative feel.

DESCRIPTION OF THE PREFERRED EMBODIMENTS

Haptic controllers according to embodiments of the present invention will be hereinafter described with reference to the drawings.

Figure 1:
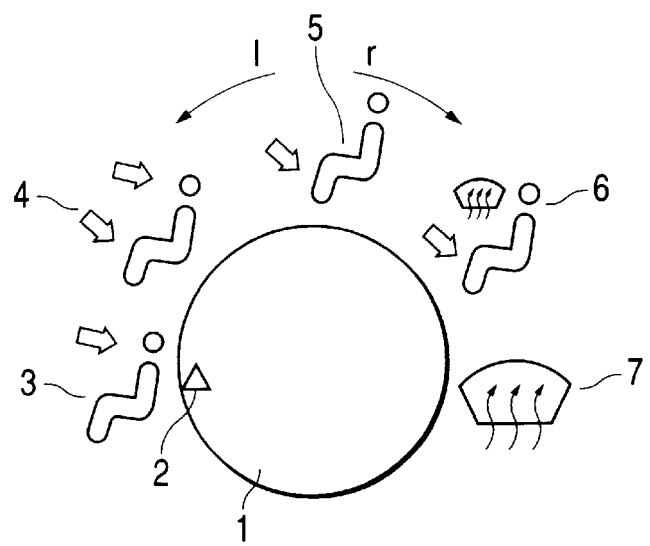
FIG. 1 is a front view of a knob that is allowed to cause a manipulative feel by a haptic controller according to a first embodiment of the present invention.

The haptic controller according to the first embodiment is provided in a vehicular apparatus. For example, for the haptic controller can include a changeover switch for switching the air outlets of an air-conditioner. As shown in FIG. 1, the changeover switch is equipped with a knob 1 as a manipulation member to be manipulated, for example, that can be rotated by hand. Identification marks 3–7 are provided around the knob 1 and indicate options and an indicator 2 for indicating a selected one of the identification marks 3–7.

Figure 2:
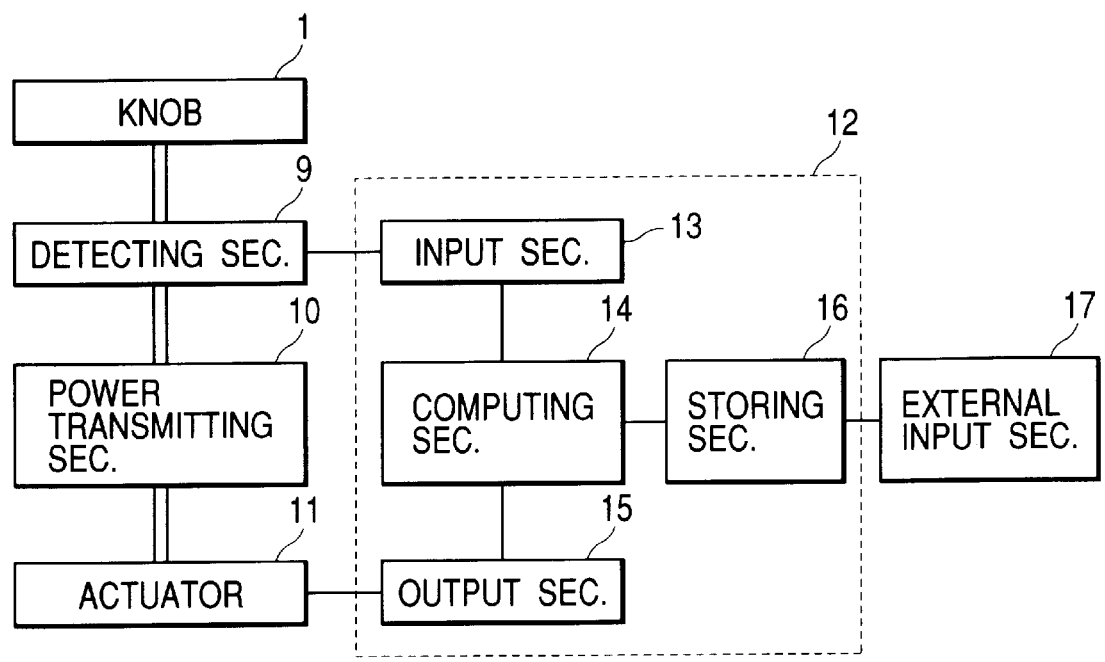
FIG. 2 is a block diagram showing the configuration of the haptic controller according to the first embodiment.

As shown in the block diagram of FIG. 2, the haptic controller according to the first embodiment is provided with an actuator 11 as a motive power source for supplying force to the knob 1 and a detecting section 9 for detecting a position of the knob 1. The haptic controller also includes a computing means 12 for calculating a control value to be used for controlling the actuator 11 in accordance with the position, in this case, the rotation angle of the knob 1 detected by the detecting section 9, and a power transmitting section 10, such as speed reducing gears for transmitting motive power generated by the actuator 11 to the knob 1.

As shown in FIG. 2, the computing means 12 includes: an input section 13 to which position data of the knob 1 detected by the detecting section 9 is input; a storing section 16 in which particular points A1–A7 (see FIG. 3) of a force pattern A (described below) that is preset to supply a prescribed force to the knob 1 in accordance with a position of the knob 1 are stored; a computing section 14 for calculating a force to be supplied to the knob 1 on the basis of the force pattern A in accordance with a position of the knob 1 detected by the detecting section 9, that is, a control value to be supplied to the actuator 11; and an output section 15 for sending the control value calculated by the computing section 14 to the actuator 11.

An external input section 17 capable of inputting data to the storing section 16 is connected to the storing section 16 so that the force pattern A can be adjusted or altered from outside the computing means 12.

Figure 3:
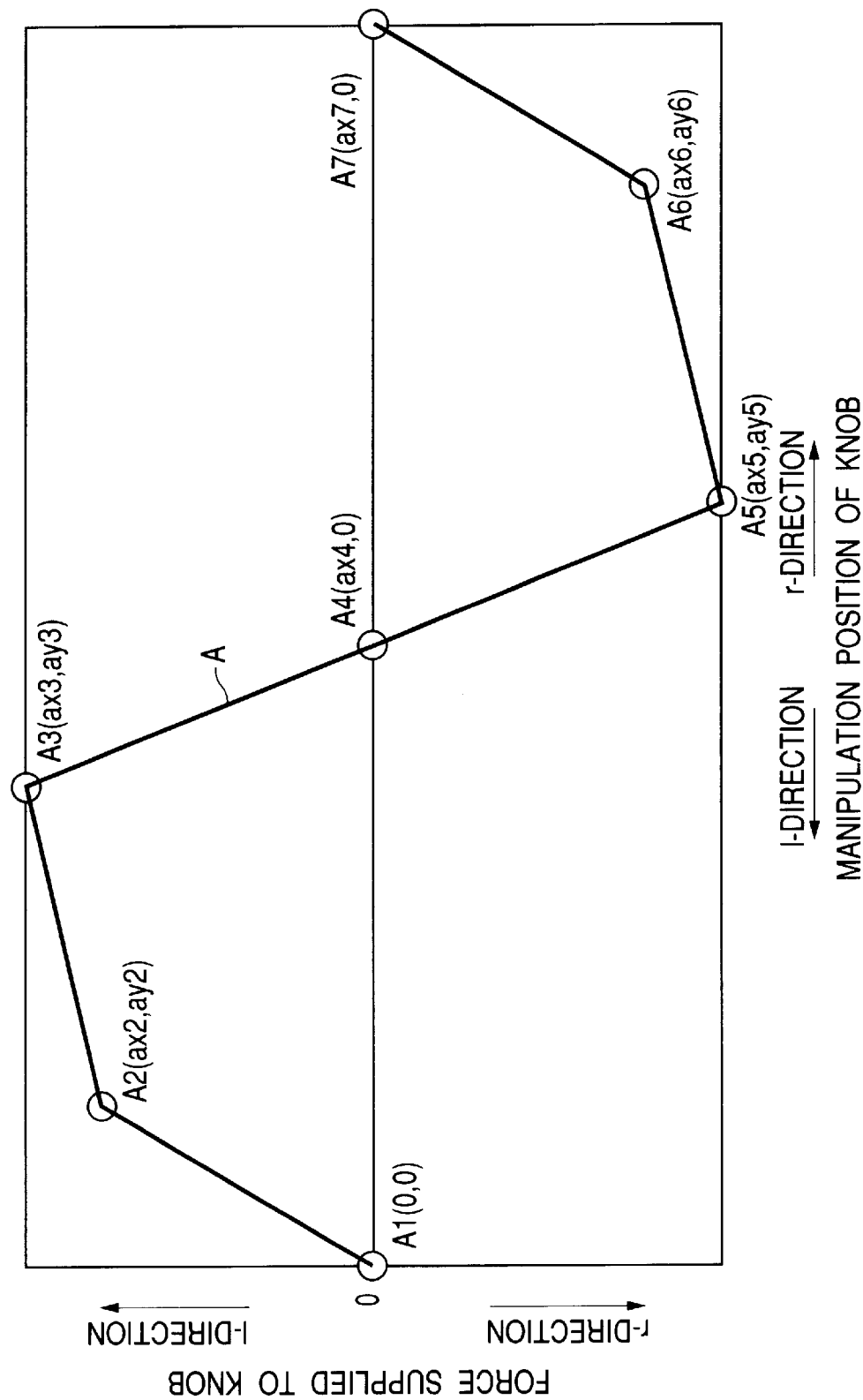
FIG. 3 illustrates a pattern of force that is supplied to the knob by the haptic controller of FIG. 2, that is, a force pattern.

As shown in FIG. 3, the force pattern A is formed by particular points A1–A7 in which forces 0, ay2, ay3, 0, ay5, ay6, and 0 to be supplied to the knob 1 are set for particular positions 0, ax2, ax3, ax4, ax5, ax6, and ax7, respectively, that are set in a movable range of the knob 1 and functions represented by straight lines. For example, the straight lines connect the particular points A1 and A2, A2 and A3, A3 and A4, A4 and A5, A5 and A6, and A6 and A7, respectively. In the force pattern A, the particular point A4 (ax4, 0) is set as a reversing point to reverse the direction of force approximately at the center of the range from the particular position 0 to the particular position ax7.

The regions from the position 0 to the position ax7 that are set in the force pattern A in the above-described manner correspond to the region from the position of the identification mark 3 to the position of the identification mark 4, the region from the position of the identification mark 4 to the position of the identification mark 5, the region from the position of the identification mark 5 to the position of the identification mark 6, and the region from the position of the identification mark 6 to the position of the identification mark 7, respectively. In each of the above regions, a force based on the force pattern A is supplied to the knob 1.

When the detecting section 9 detects a position of the knob 1, the computing section 14 determines in which region between particular positions the knob 1 is located. That is, which of the region from the position 0 to the position ax2, the region from the position ax2 to the position ax3, the region from the position ax3 to the position ax4, the region from the position ax4 to the position ax5, the region from the position ax5 to the position ax6, and the region from the position ax6 to the position ax7. Then, the computing section 14 calculates a control value for the actuator 11 on the basis of the function connecting the particular points that correspond to the two respective particular positions forming the region thus found.

Figure 4:
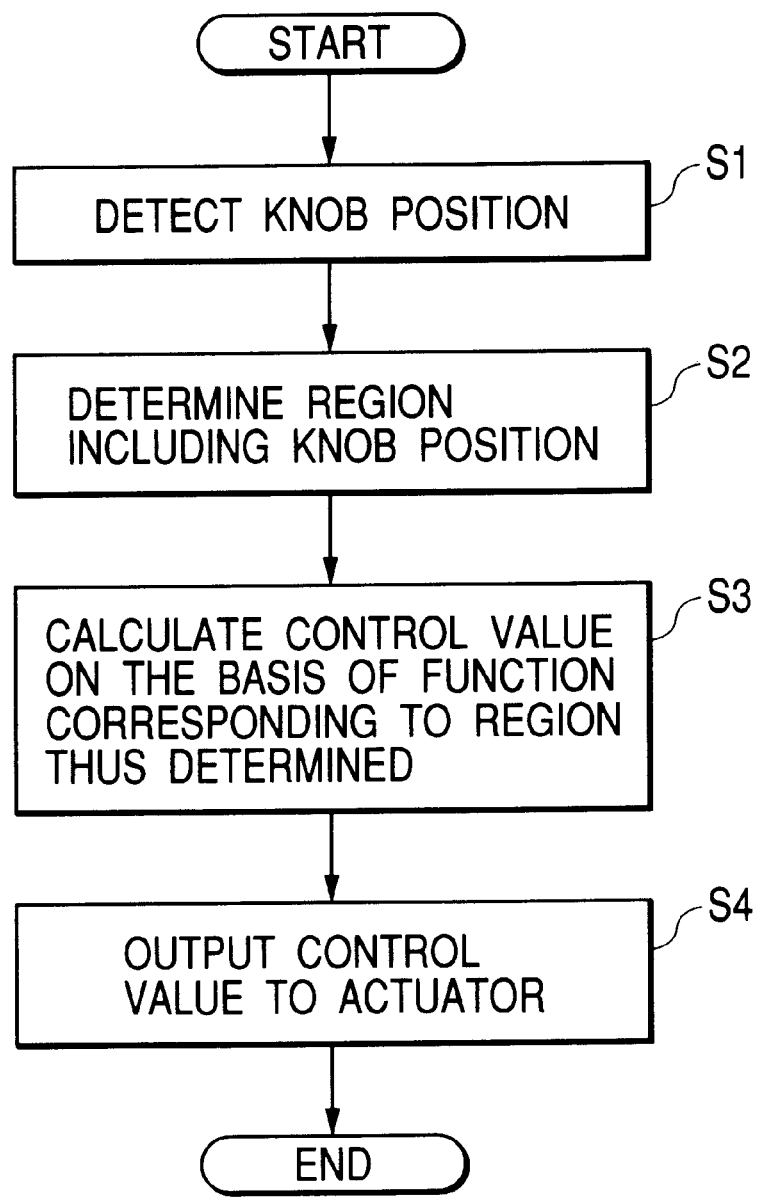
FIG. 4 is a flowchart in accordance with the invention showing a process of supplying a force to the knob by the haptic controller of FIG. 2.

For example, if the knob 1 is rotated from the position of the identification mark 3 to the position of the identification mark 4 in the r-direction, the above-configured haptic controller operates in the following manner. As shown in FIG. 4, when the knob 1 is rotated, a position of the knob 1 is detected by the detecting section 9 and position data of the knob 1 is input to the input section 13 (step S1). Then, in the computing means 12, the computing section 14 determines in which region between particular positions the position of the knob 1 is located (step S2). That is, which of the region from the position 0 to the position ax2, the region from the position ax2 to the position ax3, the region from the position ax3 to the position ax4, the region from the position ax4 to the position ax5, the region from the position ax5 to the position ax6, and the region from the position ax6 to the position ax7, the position of the knob 1 belongs to (step S2).

If it is judged that the knob 1 is located in the region from the position 0 to the position ax2, for example, a force to be supplied to the knob 1 is calculated on the basis of the function connecting the particular points A1 and A2 that correspond to the two respective particular positions 0 and ax2 forming the region between them. That is, a control value to be supplied to the actuator 11 is calculated (step S3). Then, the control value is output from the output section 15 to the actuator 11 (step S4).

Also in the case where the position of the knob 1 exists in a region other than the region from the position 0 to the position ax2, that is, one of the other regions identified above, a control value is calculated in the same manner as described above and the actuator 11 is controlled accordingly.

As the actuator 11 is controlled in the above manner, the direction of the force supplied to the knob 1 is reversed from the l-direction to the r-direction when the position of the knob 1 passes the exact center (position ax4 in FIG. 3) between the position of the identification mark 3 (position 0 in FIG. 3) and the position of the identification mark 4 (position ax7 in FIG. 3). Subsequently, a force in the r-direction is supplied to the knob 1 until the knob 1 reaches the position of the identification mark 4. Therefore, the fingers of the manipulator receives resistance from the knob 1 if the position of the knob 1 (shown by the indicator 2) is closer to the position of the identification mark 3 than the position of the identification mark 4. Correspondingly, the manipulation receives an accelerating force if the position of the knob 1 is closer to the position of the identification mark 4 than the position of the identification mark 3.

Likewise, when the knob 1 is rotated in the l-direction from the position of the identification mark 4, fingers of the manipulator receive resistance from the knob 1 if the position of the knob 1 is closer to the position of the identification mark 4 than the position of the identification mark 3. Correspondingly, the manipulator receives an accelerating force if the position of the knob 1 is closer to the position of the identification mark 3 than the position of the identification mark 4.

If the manipulator releases his fingers from the knob 1, the knob 1 is rotated automatically toward the closer identification mark.

The force pattern A of FIG. 3 is set not only for the region from the identification mark 3 to the identification mark 4 but also for each of the regions from the identification mark 4 to the identification mark 5, the region from the identification mark 5 to the identification mark 6, and the region from the identification mark 6 to the identification mark 7. Therefore, in each of the latter regions, the manipulator receives the same manipulative feel as described above.

As described above, in the first embodiment, only the particular points A1–A7 are stored in the storing section 16 and the computing section 14 calculates a control value to be supplied to the actuator 11 on the basis of one of the functions connecting the particular points A1 and A2, A2 and A3, A3 and A4, A4 and A5, A5 and A6, and A6 and A7, respectively. Therefore, the force pattern A can be set by using a small amount of data, and, hence, the work of adjusting or altering the force pattern A can be performed easily by using the external input section 17.

In the first embodiment, even if a manipulation on the knob 1 is stopped at an arbitrary position, the knob 1 is automatically relocated to the position of a closest one of the identification marks 3–7. This makes it possible to realize a knob that provides excellent ease of operation. Further, the manipulative feel of the knob 1 can be changed depending on its position relative to the identification marks 3–7. This also makes it possible to realize a knob that provides excellent ease of operation.

Figure 5:
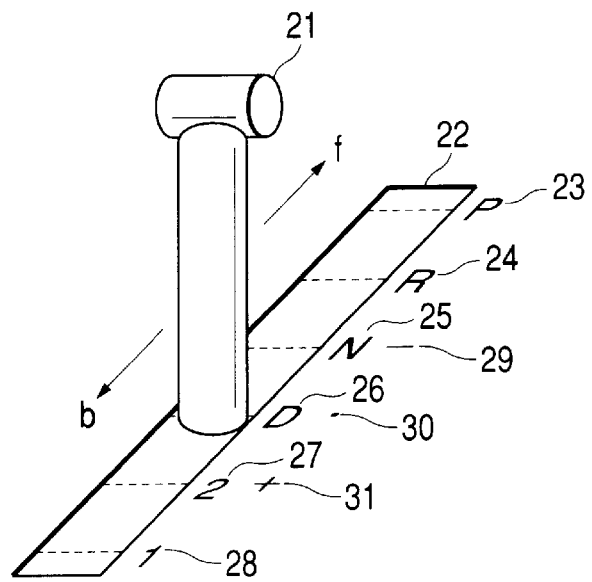
FIG. 5 is a perspective view of a shift lever capable of causing a manipulative feel according to a second embodiment of the invention.

FIG. 5 is a perspective view of a shift lever capable of causing a manipulative feel according to the second embodiment. The haptic controller according to the second embodiment is provided for the shift lever 21 of an automobile. The shift lever 21 is movable in a guide 22, and identification marks 23–31 indicating options, such as drive "D" and neutral "N," are provided beside the guide 22.

Figure 6:
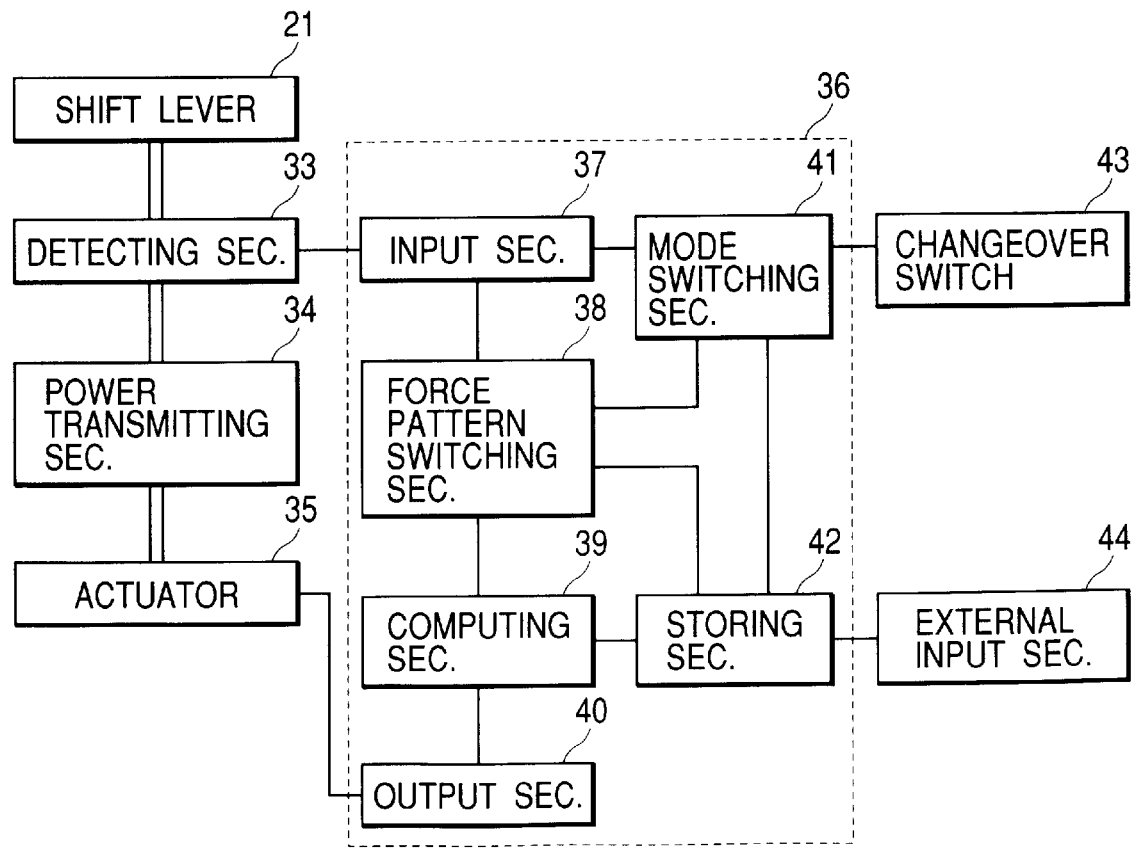
FIG. 6 is a block diagram showing the configuration of a haptic controller according to the second embodiment.

As shown in FIG. 6, the haptic controller according to the second embodiment includes: an actuator 35 as a motive power source for supplying force to the shift lever 21; a detecting section 33 for detecting a position of the shift lever 21; a computing means 36 for calculating a control value to be used for controlling the actuator 35 in accordance with the position of the shift lever 21 detected by the detecting section 33; and a power transmitting section 34, such as speed reducing gears, for transmitting motive power generated by the actuator 35 to the shift lever 21.

The computing means 36 includes: an input section 37 to which position data of the shift lever 21 detected by the detecting section 33 is input; a storing section 42 in which particular points B1–B13 and C1–C13 of respective force patterns B and C (see FIG. 7) and particular points D1–D8 and F1–F8 of respective force patterns D and F (see FIG. 8) that are preset to supply a prescribed force to the shift lever 21 in accordance with a position of the shift lever 21 are stored; a computing section 39 for calculating control value to be used for controlling the actuator 35 on the basis of the force pattern B, C, D, or F in accordance with a position of the shift lever 21 detected by the detecting section 33, and an output section 40 for sending the control value calculated by the computing section 39 to the actuator 35.

An external input section 44 capable of inputting data to the storing section 42 is connected to the storing section 42 so that the force patterns B, C, D, and F can be adjusted or altered from outside the computing means 36.

The force patterns B and C are used in an automatic mode in which the automobile is manipulated by moving the shift lever 21 to a desired one of the positions of identification marks 23–28. The identification mark 23 "P" means "parking," the identification mark 24 "R" means "reverse," the identification mark 25 "N" means "neutral," the identification nark 26 "D" means "drive," the identification mark 27 "2" means "second gear," and the identification mark 28 "1" means "low gear."

Figure 7:
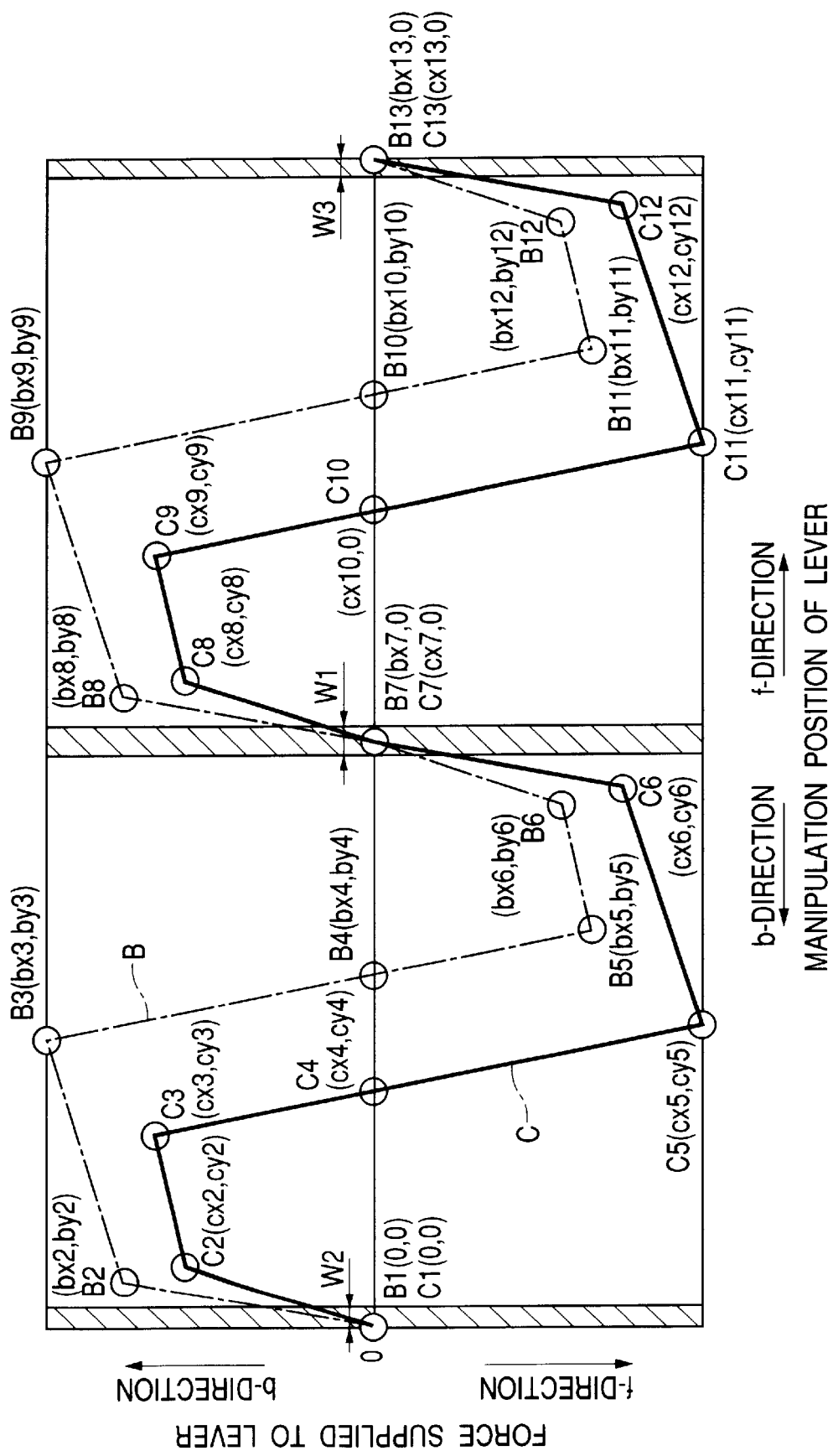
FIG. 7 illustrates a force pattern that is used in an automatic mode.

As shown in FIG. 7, the force pattern B is formed by particular points B1-B13 in which forces 0, by2, by3, 0, by5, by6, 0, by8, by9, 0, by11, by12, and 0 to be supplied to the shift lever 21 are set for particular positions 0, bx2, bx3, bx4, bx5, bx6, bx7, bx8, bx9, bx10, bx11, bx12, and bx13, respectively. The positions are set in a movable range of the shift lever 21 and the functions are represented by straight lines. For example, the line functions connect the particular points B1 and B2, B2 and B3, B3 and B4, B4 and B5, B5 and B6, B6 and B7, B7 and B8, B8 and B9, B9 and B10, B10 and B11, B11 and B12, and B12 and B13, respectively. In the force pattern B, the particular points B4, B7, and B10 are set as reversing points to reverse the direction of force to be supplied to the shift lever 21.

As shown in FIG. 7, in similarity with pattern B, the force pattern C is formed by particular points C1–C13 in which forces 0, cy2, cy3, 0, cy5, cy6, 0, cy8, cy9, 0, cy11, cy12, and 0 to be supplied to the shift lever 21 are set for particular positions 0, cx2, cx3, cx4, cx5, cx6, cx7 (=bx7), cx8, cx9, cx10, cx11, cx12, and cx13 (=bx13), respectively. The positions are set in a movable range of the shift lever 21 and the functions are represented by straight lines. For example, the line functions connect the particular points C1 and C2, C2 and C3, C3 and C4, C4 and C5, C5 and C6, C6 and C7, C7 and C8, C8 and C9, C9 and C10, C10 and C11, C11 and C12, and C12 and C13, respectively. In the force pattern C, the particular points C4, C7 (=B7), and C10 are set as reversing points to reverse the direction of force to be supplied to the shift lever 21. For example, the region from the position 0 to the position bx13 (=cx13) for which the force patterns B and C are set in the above-described manner corresponds to the region from the identification mark 25 to the identification mark 27.

Figure 8:
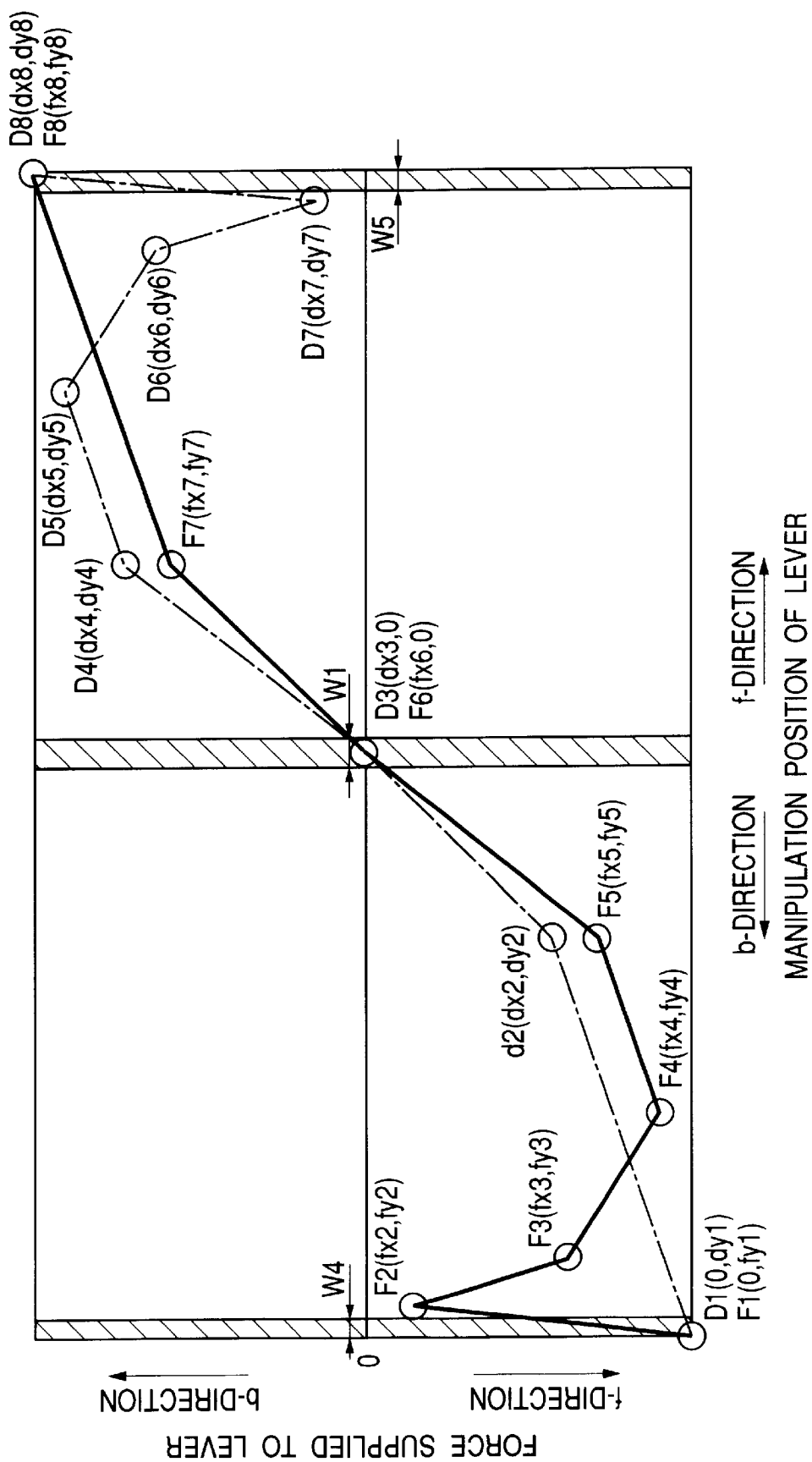
FIG. 8 illustrates a force pattern that is used in a manual mode.
Figure 9:
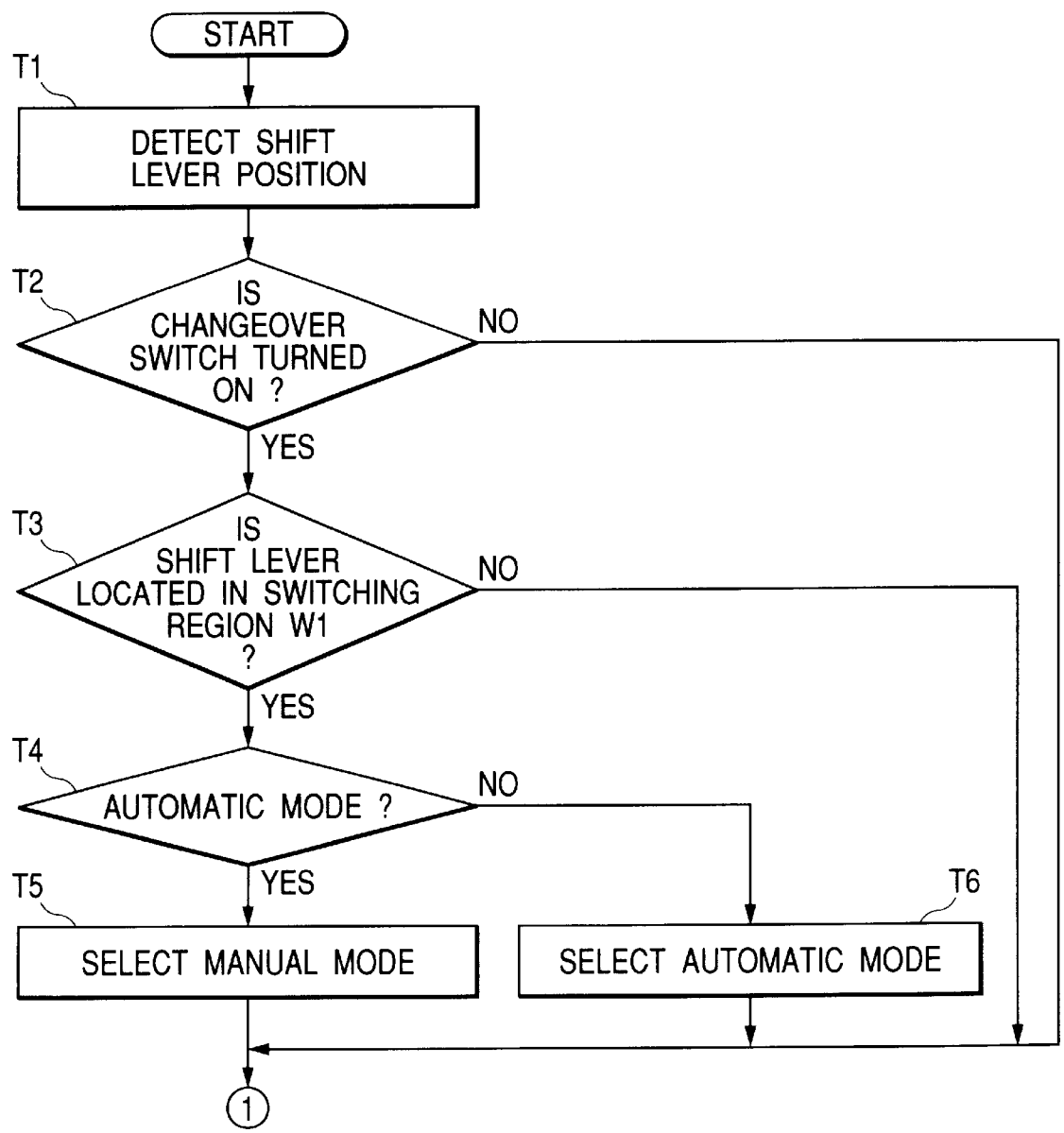
FIGS. 9 and 10 are flowcharts showing, in accordance with the invention, a process of supplying a force to the shift lever by the haptic controller of FIG. 6.
Figure 10:
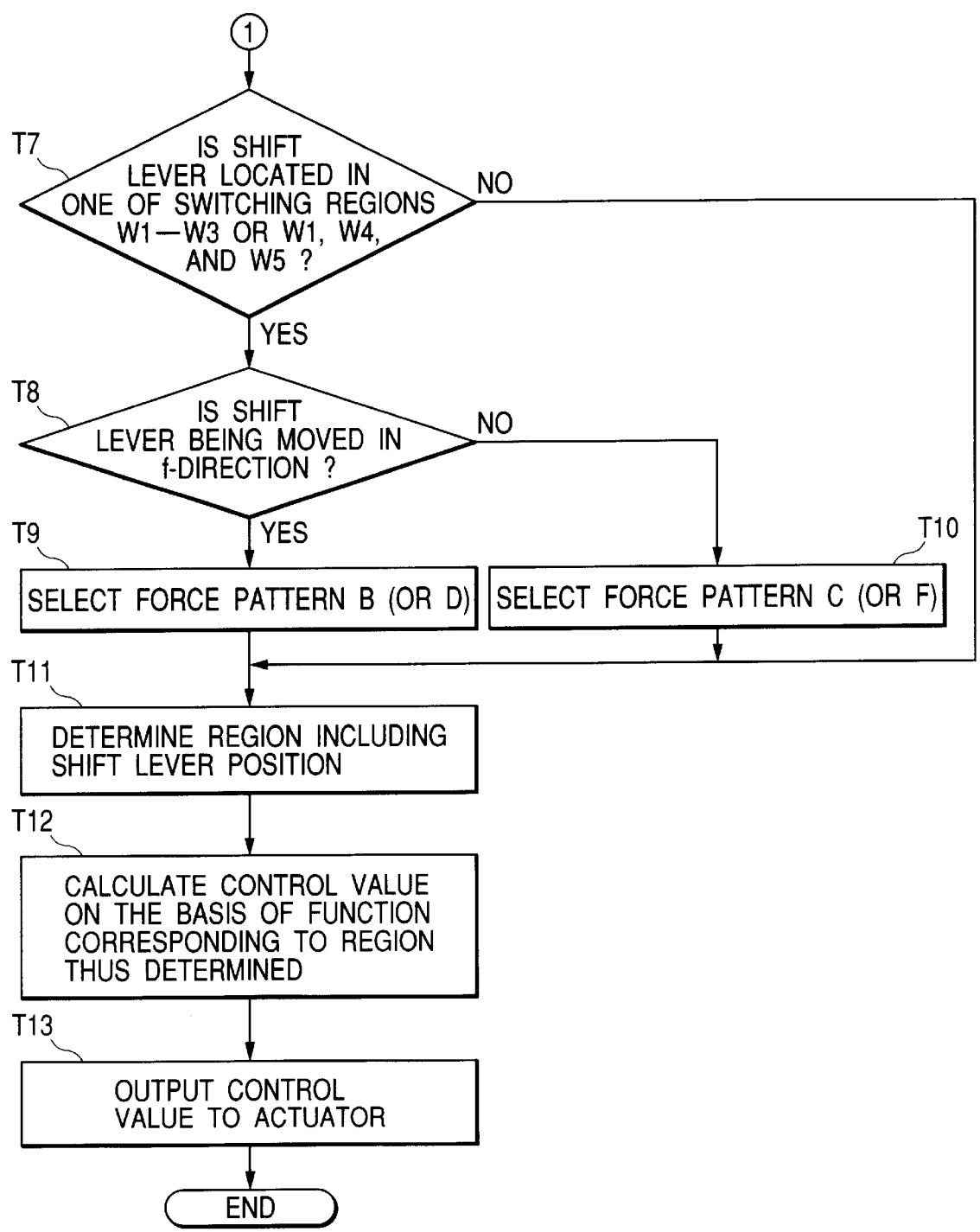

Referring to FIG. 8, the force patterns D and F are used when the shift lever 21 is manipulated in the region from the position of the identification mark 29 to the position of the identification mark 31, that is, in a manual mode in which a shift-up manipulation and a shift-down manipulation can be performed. In the manual mode, gear shifting-up is effected by moving the shift lever 21 from the position of the identification mark 30 "•" to the position of the identification mark 31 "+" and gear shifting-down is effected by moving the shift lever 21 from the position of the identification mark 30 "•" to the position of the identification mark 29 "-."

As shown in FIG. 8, the force pattern D is formed by particular points D1–D8 in which forces dy1, dy2, 0, dy4, dy5, dy6, dy7, and dy8 to be supplied to the shift lever 21 are set for particular positions 0, dx2, dx3, dx4, dx5, dx6, dx7, and dx8, respectively. The positions are set in a movable range of the shift lever 21 and the functions are represented by straight lines. For example, the line functions connect the particular points D1 and D2, D2 and D3, D3 and D4, D4 and D5, D5 and D6, D6 and D7, and D7 and D8, respectively. In the force pattern D, the particular point D3 is set as a reversing point to reverse the direction of force to be supplied to the shift lever 21.

As shown in FIG. 8, in similarity to pattern D, the force pattern F is formed by particular points F1–F8 in which forces fy1, fy2, fy3, fy4, fy5, 0, fy7, and fy8 to be supplied to the shift lever 21 are set for particular positions 0, fx2, fx3, fx4, fx5, fx6 (=dx3), fx7, and fx8 (=dx8), respectively. The positions are set in a movable range of the shift lever 21 and functions are represented by straight lines. For example, the line functions connect the particular points F1 and F2, F2 and F3, F3 and F4, F4 and F5, F5 and F6, F6 and F7, and F7 and F8, respectively. In the force pattern F, the particular point F6 (=D3) is set as a reversing point to reverse the direction of force to be supplied to the shift lever 21.

The region from the position 0 to the position dx8 (=fx8), for which the force patterns D and F are set in the above-described manner, corresponds to the region from the the position of the identification mark 29 to the position of the identification mark 31.

In particular, as shown in FIG. 6, the second embodiment is different from the first embodiment in that the computing means 36 is provided with a mode switching section 41 and a force pattern switching section 38. When a changeover switch 43 that is provided on the steering wheel, for example, is turned on, the mode switching section 41 switches from the automatic mode to the manual mode or vice versa if the shift lever 21 is located in a switching region W1 (see FIGS. 7 and 8).

Referring to FIGS. 5, 6, and 8, the automatic mode, the force pattern switching section 38 selects the force pattern B if the shift lever 21 is being moved in the switching region W1, W2, or W3 in an f-direction and selects the force pattern C if the shift lever 21 is being moved in the switching region W1, W2, or W3 in a b-direction. The force patterns B and C are set in such a manner that in the switching regions W1, W2, and W3, the points B1, B7, and B13 of the force pattern B coincide with the points C1, C7, and C13 of the force pattern C, respectively. Within regions W1, W2, and W3, the forces of the force patterns B and C are in the same direction and their difference is small and within a prescribed value.

Referring to FIGS. 5, 6, and 8, the manual mode, the force pattern switching section 38 selects the force pattern D if the shift lever 21 is being moved in the switching region W1, W4, or W5 in the f-direction and selects the force pattern F if the shift lever 21 is being moved in the switching region W1, W4, or W5 in the b-direction.

If the detecting section 33 detects a position of the shift lever 21 in a state that the force pattern B is used, the computing section 39 judges which region between particular positions, that is, which of the region from the position 0 to the position bx2, the region from the position bx2 to the position bx3, the region from the position bx3 to the position bx4, the region from the position bx4 to the position bx5, the region from the position bx5 to the position bx6, the region from the position bx6 to the position bx7, the region from the position bx7 to the position bx8, the region from the position bx8 to the position bx9, the region from the position bx9 to the position bx10, the region from the position bx10 to the position bx11, the region from the position bx11 to the position bx12, and the region from the position bx12 to the position bx13, the position of the shift lever 21 belongs to. Then, the computing section 39 calculates a control value to be supplied to the actuator 35 on the basis of a function connecting the particular points that correspond to the two respective particular positions forming the region thus found.

If the detecting section 33 detects a position of the shift lever 21 in a state that the force pattern C is used, the computing section 39 determines in which region between particular positions the shift lever 21 is located. That is, which of the region from the position 0 to the position cx2, the region from the position cx2 to the position cx3, the region from the position cx3 to the position cx4, the region from the position cx4 to the position cx5, the region from the position cx5 to the position cx6, the region from the position cx6 to the position cx7, the region from the position cx7 to the position cx8, the region from the position cx8 to the position cx9, the region from the position cx9 to the position cx10, the region from the position cx10 to the position cx11, the region from the position cx11 to the position cx12, and the region from the position cx12 to the position cx13. Then, the computing section 39 calculates a control value to be supplied to the actuator 35 on the basis of a function connecting the particular points that correspond to the two respective particular positions forming the region thus found.

If the detecting section 33 detects a position of the shift lever 21 in a state that the force pattern D is used, the computing section 39 determines in which region between particular positions the shift lever 21 is located. That is, which of the regions from the position 0 to the position dx2, the region from the position dx2 to the position dx3, the region from the position dx3 to the position dx4, the region from the position dx4 to the position dx5, the region from the position dx5 to the position dx6, the region from the position dx6 to the position dx7, and the region from the position dx7 to the position dx8. Then, the computing section 39 calculates a control value to be supplied to the actuator 35 on the basis of a function connecting the particular points that correspond to the two respective particular positions forming the region thus found.

If the detecting section 33 detects a position of the shift lever 21 in a state that the force pattern F is used, the computing section 39 determines in which region between particular positions the shift lever 21 is located. That is, which of the region from the position 0 to the position fx2, the region from the position fx2 to the position fx3, the region from the position fx3 to the position fx4, the region from the position fx4 to the position fx5, the region from the position fx5 to the position fx6, the region from the position fx6 to the position fx7, and the region from the position fx7 to the position fx8. Then, the computing section 39 calculates a control value to be supplied to the actuator 35 on the basis of a function connecting the particular points that correspond to the two respective particular positions forming the region thus found.

The above-configured haptic controller according to the second embodiment operates in the following manner.

First, an operation in the automatic mode will be described.

Referring to FIGS. 5, 6, 7, 9, and 10, the shift lever 21 is moved in the region from the position of the identification mark 25 to the position of the identification mark 26, a position of the shift lever 21 is detected by the detecting section 33 and position data of the shift lever 21 is input to the input section 37 (step T1).

Then, the mode switching section 41 judges whether the changeover switch 43 is turned on (step T2). If at present the automatic mode is used and the changeover switch 43 is off (no), the force pattern switching section 38 of the computing means 36 judges whether the shift lever 21 is located in one of the switching regions W1, W2, and W3 shown in FIG. 7 (step T7). If the shift lever 21 is not located in any of the switching regions W1, W2, and W3 (no), the computing section 39 calculates a force to be supplied to the shift lever 21 on the basis of a force pattern currently used, for example, the force pattern B, and the actuator 35 is controlled so that the calculated force is supplied to the shift lever 21 (steps T11–T13).

In steps T11–T13, first the computing section 39 determines in which region between particular positions the position of the shift lever 21 is locates (step T11). That is, which of the region from the position 0 to the position bx2, the region from the position bx2 to the position bx3, the region from the position bx3 to the position bx4, the region from the position bx4 to the position bx5, the region from the position bx5 to the position bx6, the region from the position bx6 to the position bx7, the region from the position bx7 to the position bx8, the region from the position bx8 to the position bx9, the region from the position bx9 to the position bx10, the region from the position bx10 to the position bx11, the region from the position bx11 to the position bx12, and the region from the position bx12 to the position bx13.

If it is judged that the shift lever 21 is located in the region from the position bx2 to the position bx3, for example, a control value to be supplied to the actuator 35 is calculated on the basis of the function connecting the particular points B2 and B3. The points correspond to the two respective particular positions bx2 and bx3 and the region between them (step T12). The control value is then output from the output section 40 to the actuator 35 (step T13).

Also in the case of calculating a force to be supplied to the shift lever 21 on the basis of the force pattern C, which region between particular positions the position of the shift lever 21 belongs to, is judged (step T11). A control value to be supplied to the actuator 35 is calculated on the basis of a function connecting particular points that correspond to the two respective particular positions that define the region thus found (step T12). The control value is then output from the output section 40 to the actuator 35 (step T13).

If it is judged at step T7 that the shift lever 21 is located in one of the switching regions W1–W3 shown in FIG. 7 (yes), it is judged whether the shift lever 21 is being moved in the f-direction (step T8). For example, if it is judged that the shift lever 21 is being moved in the f-direction (yes), the force pattern B is selected (step T9). If it is judged that the shift lever 21 is not being moved in the f-direction (no), that is, the shift lever 21 is being moved in the b-direction, the force pattern C is selected (step T10).

Therefore, when, for example, the shift lever 21 is moved from the position of the identification mark 26 (the position bx7 or cx7 in FIG. 7) to the position of the identification mark 25 (the position bx13 or cx13 in FIG. 7), the force to be supplied to the shift lever 21 is controlled on the basis of the force pattern B. That is, when the shift lever 21 starts to be moved from the position of the identification mark 26, strong resistance (a force in the b-direction) against the manipulation force (a force in the f-direction) is given to the fingers of the manipulator. When the shift lever 21 comes closer to the position of the identification mark 25 than the position of the identification mark 26, an accelerating force toward the position of the identification mark 25 (a force in the f-direction) is produced.

When the shift lever 21 is moved from the position of the identification mark 25 to the position of the identification mark 26, the force to be supplied to the shift lever 21 is controlled on the basis of the force pattern C. That is, when the shift lever 21 starts to be moved from the position of the identification mark 25, strong resistance (a force in the f-direction) against the manipulation force (a force in the b-direction) is given to the fingers of the manipulator. When the shift lever 21 comes closer to the position of the identification mark 26 than the position of the identification mark 25, an accelerating force toward the position of the identification mark 26 (a force in the b-direction) is produced. Therefore, the manipulator can receive the same manipulative feel when he moves the shift lever 21 in the f-direction and in the b-direction.

At the time of switching between force patterns, a large change does not occur between a force that is supplied to the shift lever 21 before the switching and that after the switching, because the points B1, B7, and B13 of the force pattern B coincide with the points C1, C7, and C13 of the force pattern C, respectively. Also, forces of the force patterns B and C are in the same direction and their difference is small and within the prescribed value.

Next, a description will be made of an operation that is performed when switching is made from the automatic mode to the manual mode. When the shift lever 21 is manipulated, its position is detected by the detecting section 33 and position data of the shift lever 21 is input to the input section 37 (step T1).

At this time, the mode switching section 41 of the computing means 36 judges whether the changeover switch 43 is turned on (step T2). Since the changeover switch 43 is turned on (yes), it is judged whether the shift lever 21 is close to the position of the identification mark 26, that is, whether the shift lever 21 is located in the switching region W1 (step T3). If the shift lever 21 is located in the switching region W1 (yes), it is judged whether the current mode is the automatic mode (step T4). Since the current mode is the automatic mode (yes), switching is made to the manual mode shown in FIG. 8 (step T5).

Then, the force pattern switching section 38 of the computing means 36 judges whether the shift lever 21 is located in one of the switching regions W1, W4, and W5 (step T7). Since the shift lever 21 is located in the switching region W1 (yes), it is judged whether the shift lever 21 is being moved in the f-direction (step T8). If the shift lever 21 is being moved in the f-direction (yes), the force pattern D is selected (step T9). If the shift lever 21 is being moved in the b-direction (no), the force pattern F is selected (step T10). If the force pattern D, for example, is selected, the computing section 39 calculates a force to be supplied to the shift lever 21 on the basis of the force pattern D and the actuator 35 is controlled so that the calculated force is supplied to the shift lever 21 (steps T11–T13).

In steps T11–T13, first the computing section 39 determines in which region between particular positions the shift lever 21 is located (step T11). That is, which of the regions from the position 0 to the position dx2, the region from the position dx2 to the position dx3, the region from the position dx3 to the position dx4, the region from the position dx4 to the position dx5, the region from the position dx5 to the position dx6, the region from the position dx6 to the position dx7, and the region from the position dx7 to the position dx8.

If it is judged that the shift lever 21 is located in the region from the position dx4 to the position dx5, for example, a control value to be supplied to the actuator 35 is calculated on the basis of the function connecting the particular points D4 and D5. The points correspond to the two respective particular positions dx4 and dx5 and the region between them (step T12). The control value is then output from the output section 40 to the actuator 35 (step T13).

In the manual mode, the force pattern switching section 38 judges whether the shift lever 21 is located in one of the switching regions W1, W4, and W5 (step T7). If it is judged that the shift lever 21 is located in one of the switching regions W1, W4, and W5 (yes), it is judged whether the shift lever 21 is being moved in the f-direction (step T8). If the shift lever 21 is being moved in the f-direction (yes), the force pattern D is selected (step T9). If the shift lever 21 is being moved in the b-direction (no), the force pattern F is selected (step T10). As a result, the force that is supplied to the shift lever 21 always acts as resistance against the manipulation force. Accordingly, the manipulator receives the same manipulative feel (resistance) when he performs a shift-down manipulation and a shift-up manipulation.

If the manipulator releases his fingers from the shift lever 21 at a halfway position while moving the shift lever 21 from the position of the identification mark 30 (the position dx3 or fx6 in FIG. 8) toward the position of the identification mark 29 (the position dx8 or fx8 in FIG. 8), the shift lever 21 is returned to the position of the identification mark 30 because a force in the b-direction is being supplied to the shift lever 21. Similarly, if the manipulator releases his fingers from the shift lever 21 at a halfway position while moving the shift lever 21 from the position of the identification mark 30 toward the position of the identification mark 31 (the position dx1 or fx1 in FIG. 8), the shift lever 21 is returned to the position of the identification mark 30 because a force in the f-direction is being supplied to the shift lever 21.

As described above, in the second embodiment, as in the case of the first embodiment, the particular points B1–B13 are stored in the storing section 42 to set the force pattern B, the particular points C1–C13 are stored in the storing section 42 to set the force pattern C, the particular points D1–D8 are stored in the storing section 42 to set the force pattern D, and the particular points F1–F8 are stored in the storing section 42 to set the force pattern F. And the computing section 39 calculates a control value for the actuator 35 on the basis of a function connecting adjoining particular points of each force pattern. Therefore, each of the force patterns B–F can be set by using a small amount of data, and hence, adjusting or altering the force patterns B–F can be performed easily by using the external input section 44.

According to the second embodiment, a large change does not occur between a force that is supplied to the shift lever 21 before switching between the force patterns B and C and that after the switching. This allows a manipulator to have almost no incongruous feeling due to a force change at the time of force pattern switching.

According to the second embodiment, the feel in manipulating the shift lever 21 can be varied in accordance with the position of the shift lever 21 relative to the identification marks 23–31. This makes it possible to realize a shift lever that provides excellent ease of operation.

According to the second embodiment, even if a manipulator stops manipulating the shift lever 21 at an arbitrary position, the shift lever 21 can automatically be relocated to the position of a closest one of the identification marks 23–28. This also contributes to realization of a shift lever that provides excellent ease of operation.

In the first and second embodiments, each force pattern is represented by functions defined on a plane because the position of the knob 1 or the shift lever 21 can be represented by the one-dimensional coordinate. However, the invention is not limited to such a case. For example, a force pattern may be represented by functions defined in a space in the case where a manipulation member is manipulated in many directions as in the case of a manipulation lever that is swung back and forth and to the right and left.

Although in the first and second embodiments each adjoining pair of particular points are connected by a function represented by a straight line, the invention is not limited to such a case. For example, each adjoining pair of particular points may be connected by a function represented by a curve.

As described above, according to the invention, a force pattern can be set by using a small amount of data because the force pattern is set by storing particular points in the storing section and a function connecting particular points that correspond to respective adjoining particular positions is determined by the computing section. This makes it easier to adjust or alter the force pattern.

In the invention, at least one of the particular points in the movement range of the manipulation member may be a reversing point to reverse the direction of force to be supplied to the manipulation member. In this case, even if a manipulator stops manipulating the manipulation member at an arbitrary position in the movement range, the manipulation member is supplied with such a force as to be directed toward one of the two positions forming the movement range. Therefore, the manipulation member can be relocated to the one of the two positions forming the movement range. This makes it possible to realize a manipulation member that provides excellent ease of operation.

In the invention, a plurality of force patterns may be set, and a force pattern switching section may be provided that switches between force patterns in a state that the manipulation member is located in a prescribed region of the movement range of the manipulation member. In this case, force pattern switching is not made at a certain position but in a prescribed region. This makes it easier to judge whether switching is necessary and increases the reliability of the force pattern switching. Therefore, an erroneous control on the force to be supplied to the manipulation member can be prevented.

In the invention, the force pattern switching section may switch between force patterns when forces of the force patterns concerned are in the same direction. In this case, the direction of a force that is supplied to the manipulation member after force pattern switching remains the same as that before the switching. This makes it possible to reduce the degree of an incongruous feeling a manipulator may have due to a force change at the time of force pattern switching, and allows the manipulator to manipulate the manipulation member smoothly.

In the invention, the force pattern switching section may switch between force patterns when the difference between the magnitudes of forces of the respective force patterns concerned is within a prescribed value. In this case, only a small force change occurs between a force that is supplied to the manipulation member before force pattern switching and that after the switching. This also contributes to reducing the degree of an incongruous feeling a manipulator may have due to a force change at the time of force pattern switching, and allows the manipulator to manipulate the manipulation member smoothly.

In accordance with the invention, identification marks may be provided around the manipulation member so as to correspond to prescribed regions in the movement range of the manipulation member. In this case, the feel in manipulating the manipulation member can be varied relative to the positions of the identification marks. This makes it possible to realize a manipulation member that provides excellent ease of operation.

Also, in accordance with the invention, the haptic controller may be provided in a manipulation device for manipulating a vehicular apparatus. In this case, the manipulation member provided in the manipulation device of the vehicular apparatus can cause a manipulative feel. Therefore, the operability of not only the manipulation device but also the vehicular apparatus can be enhanced.

What is claimed is:

1. A haptic controller comprising:

an actuator as a motive power source for supplying force to a manipulation member that is manipulated manually;

a detecting section for detecting a position of the manipulation member; and computing means for calculating a control value to be used for controlling the actuator on the basis of the position of the manipulation member detected by the detecting section, the computing means comprising:

a storing section for storing a force pattern that is preset to supply a prescribed force to the manipulation member in accordance with the position of the manipulation member; and a computing section for calculating the control value on the basis of the force pattern and the position of the manipulation member detected by the detecting section, wherein the force pattern is formed by particular points in which forces to be supplied to the manipulation member are set for a plurality of particular positions that are within a movement range of the manipulation member and prescribed functions connect each pair of adjoining ones of the particular positions, wherein regions are defined between the particular positions, and wherein the computing section determines in which region the position of the manipulation member detected by the detecting section is located, and calculates the control value on the basis of the prescribed function that corresponds to the region.

2. The haptic controller according to claim 1, wherein at least one of the particular points in the movement range of the manipulation member comprises a reversing point to reverse a direction of force to be supplied to the manipulation member.

3. The haptic controller according to claim 2, wherein the haptic controller is provided in a manipulation device for manipulating a vehicular apparatus.

4. The haptic controller according to claim 2, further comprising identification marks around the manipulation member to correspond to prescribed regions in the movement range of the manipulation member.

5. The haptic controller according to claim 4, wherein the haptic controller comprises a portion of a manipulation device for manipulating a vehicular apparatus.

6. The haptic controller according to claim 2, wherein a plurality of force patterns are set, wherein each of the plurality of force patterns are characterized by a magnitude and a direction, and wherein the haptic controller further comprises a force pattern switching section for switching between force patterns wherein the manipulation member is located in a prescribed region of the movement range of the manipulation member.

7. The haptic controller according to claim 6, wherein the force pattern switching section switches between force patterns when a difference between magnitudes of the forces of the respective force patterns is within a prescribed value.

8. The haptic controller according to claim 6, wherein the force pattern switching section switches between force patterns when the forces of the force patterns are in the same direction.

9. The haptic controller according to claim 8, wherein the force pattern switching section switches between force patterns when a difference between the magnitudes of forces of the respective force patterns is within a prescribed value.

10. The haptic controller according to claim 1, wherein respective force patterns are set, wherein each of the plurality of force patterns are characterized by a magnitude and a direction, and wherein the haptic controller further comprises a force pattern switching section for switching between force patterns when the manipulation member is located in a prescribed region of the movement range of the manipulation member.

11. The haptic controller according to claim 3, wherein the force pattern switching section switches between force patterns when the forces of the force patterns are in the same direction.

12. The haptic controller according to claim 11, wherein the haptic controller comprises a portion of a manipulation device for manipulating a vehicular apparatus.

13. The haptic controller according to claim 11, wherein the force pattern switching section switches between force patterns when a difference between magnitudes of the forces of the respective force patterns is within a prescribed value.

14. The haptic controller according to claim 11, further comprising identification marks around the manipulation member to correspond to prescribed regions in the movement range of the manipulation member.

15. The haptic controller according to claim 3, wherein the force pattern switching section switches between force patterns when a difference between the magnitudes of forces of the respective force patterns is within a prescribed value.

16. The haptic controller according to claim 15, further comprising identification marks around the manipulation member to correspond to prescribed regions in the movement range of the manipulation member.

17. The haptic controller according to claim 15, wherein the haptic controller comprises a portion of a manipulation device for manipulating a vehicular apparatus.

18. The haptic controller according to claim 10, further comprising identification marks around the manipulation member to correspond to prescribed regions in the movement range of the manipulation member.

19. The haptic controller according to claim 10, wherein the haptic controller comprises a portion of a manipulation device for manipulating a vehicular apparatus.

20. The haptic controller according to claim 1, wherein the haptic controller comprises a portion of a manipulation device for manipulating a vehicular apparatus.

* * * * *